United States Patent [19]
Hohnl et al.

[11] Patent Number: 5,836,144
[45] Date of Patent: Nov. 17, 1998

[54] MOUNTING PLATE FOR MOWER DECK

[75] Inventors: Gary David Hohnl, Slinger; Dean William Benter, Horicon, both of Wis.

[73] Assignee: Deere & Company, Moline, Ill.

[21] Appl. No.: 788,972

[22] Filed: Jan. 24, 1997

[51] Int. Cl.[6] .................................................. A01D 34/82
[52] U.S. Cl. ...................... 56/320.1; 56/17.5; 56/DIG. 9; 56/DIG. 22
[58] Field of Search ................................ 56/320.1, 320.2, 56/17.5, 255, 295, DIG. 17, DIG. 20, DIG. 22, DIG. 9, 11.6

[56] References Cited

U.S. PATENT DOCUMENTS

| | | | |
|---|---|---|---|
| 2,742,750 | 4/1956 | Funk | 56/25.4 |
| 3,028,719 | 4/1962 | Jepson | 56/295 |
| 4,205,512 | 6/1980 | Thorud | 56/13.4 |
| 4,226,074 | 10/1980 | Mullet et al. | 56/320.2 |
| 4,231,215 | 11/1980 | Klas | 56/11.6 |
| 4,317,325 | 3/1982 | Marto | 56/11.6 |
| 4,707,971 | 11/1987 | Forpahl et al. | 56/6 |
| 4,724,660 | 2/1988 | Bowie et al. | 56/13.6 |
| 4,869,054 | 9/1989 | Hostetler et al. | 56/6 |
| 4,887,420 | 12/1989 | Cerny, Jr. et al. | 56/320.2 |
| 4,938,011 | 7/1990 | Pernia | 56/255 |
| 4,958,484 | 9/1990 | Busboom | 56/255 |
| 5,070,683 | 12/1991 | Eggenmueller | 56/13.8 |
| 5,129,217 | 7/1992 | Loehr | 56/13.6 |
| 5,133,176 | 7/1992 | Baumann et al. | 56/17.4 |
| 5,161,353 | 11/1992 | Bergkamp | 56/6 |
| 5,205,112 | 4/1993 | Tillotson et al. | 56/2 |
| 5,212,938 | 5/1993 | Zenner | 56/320.1 |
| 5,214,906 | 6/1993 | Saki et al. | 56/320.2 |
| 5,251,430 | 10/1993 | Matsumoto et al. | 56/320.2 |
| 5,267,429 | 12/1993 | Kettler | 56/295 |
| 5,390,480 | 2/1995 | Simonson et al. | 56/320.2 |
| 5,410,867 | 5/1995 | Plamper et al. | 56/320.2 |

OTHER PUBLICATIONS

Brochure published by a company known as Castlegarden, entitled "Trattorino Aufsitzmaher 12,5—14 HP, USO E Manutenzione Gebrauch Und Vartung", 14 pages, published in Italy prior to 1996.

Brochure published by Troy–bilt, entitled "Troy–bilt Tractors", 12 pages, publication date unknown, published in the U.S.A.

Sales Manual published by Deere & Co., pages for "GS30, GS45 and GS75 Commercial Walk–Behind Mowers", pp. C10–200–1 and C10–200–5, published in the U.S.A. prior to 1996.

*Primary Examiner*—Terry Lee Melius

[57] ABSTRACT

A multiple spindle mower deck within which a plurality of mower blades rotate for mowing grass and having spindle housings which rotatively support respective mower blades, the spindle housings being operatively rigidly fixed with the mower deck. A belt drive mechanism drives the spindles, and includes pulleys mounted to respective spindles and a belt which operatively engages the pulleys. At least one idler pulley engages the belt. A mounting plate is provided to which said at least one idler pulley is mounted. The mounting plate is operatively fixed with the spindle housings, position above and press into abutement with the upper surface of the top wall of the mower deck by way of the same bolts which fix the spindle housing to the mower deck. The spindle housings are fixed to the mower deck by the spindle housing bolts which operatively press the spindle housings deck and mounting plate together. One of the idler pulleys is a tensioning idler which engages the belt for placing tension in the belt, and a tensioning mechanism operatively engages the tensioning pulley for applying a force to the idler pulley. The tensioning mechanism is mounted to said mounting plate.

11 Claims, 8 Drawing Sheets

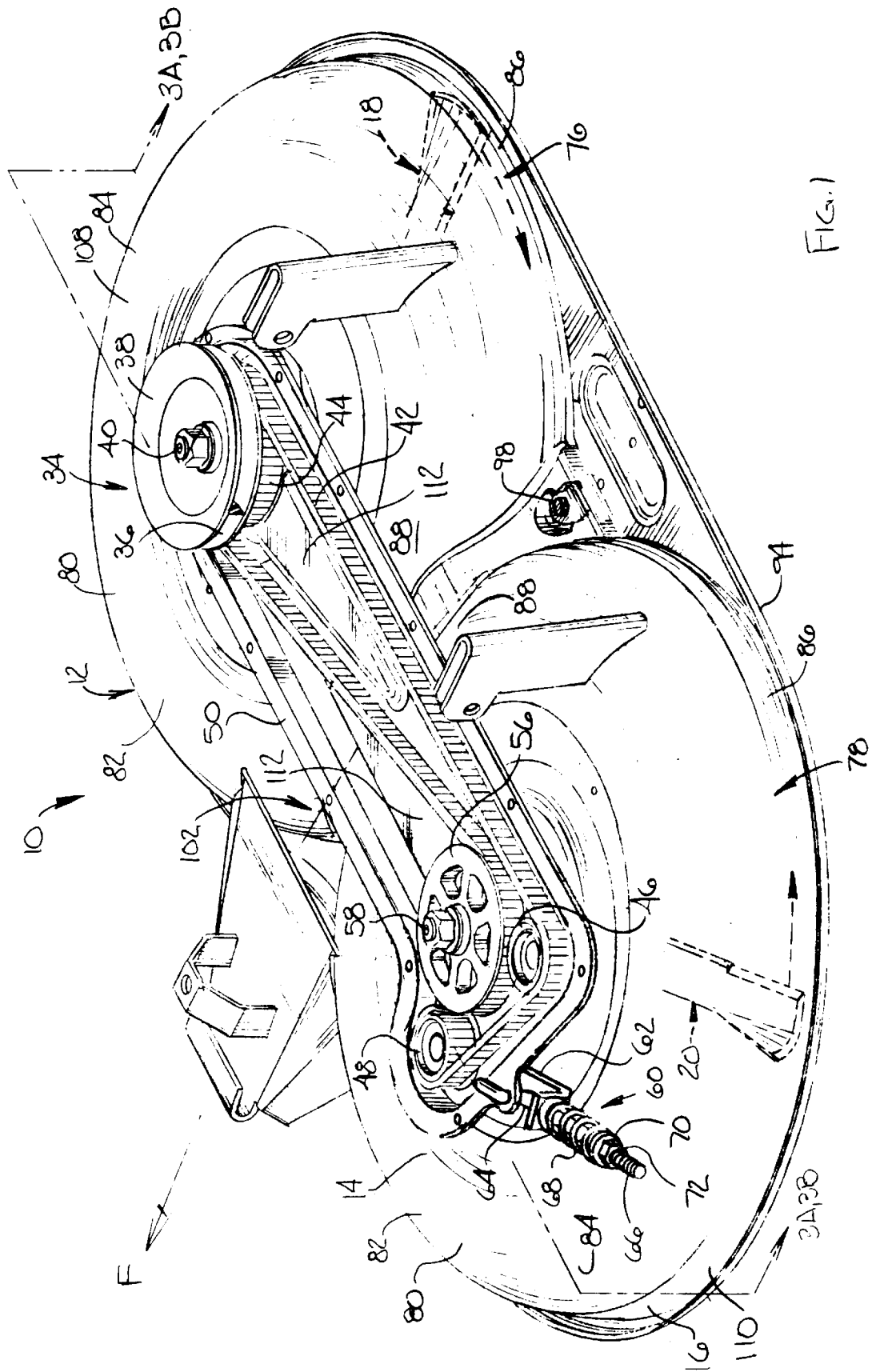

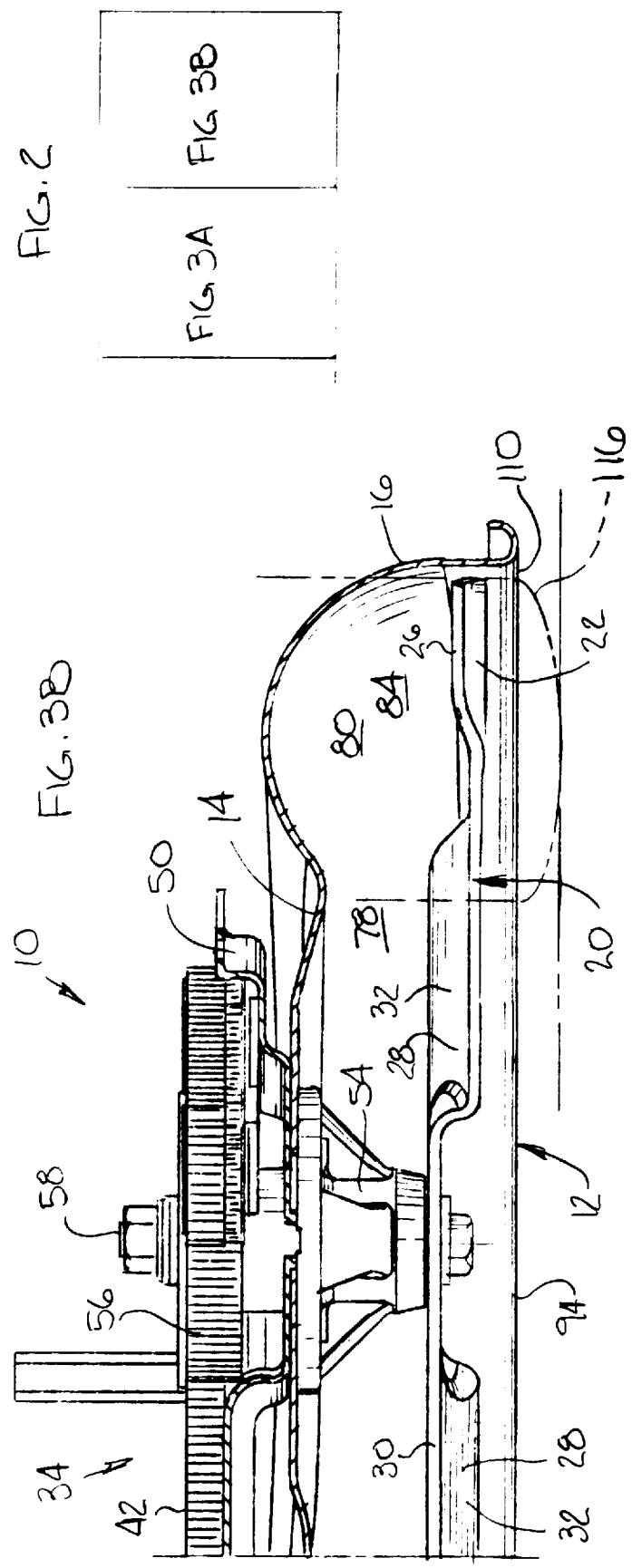

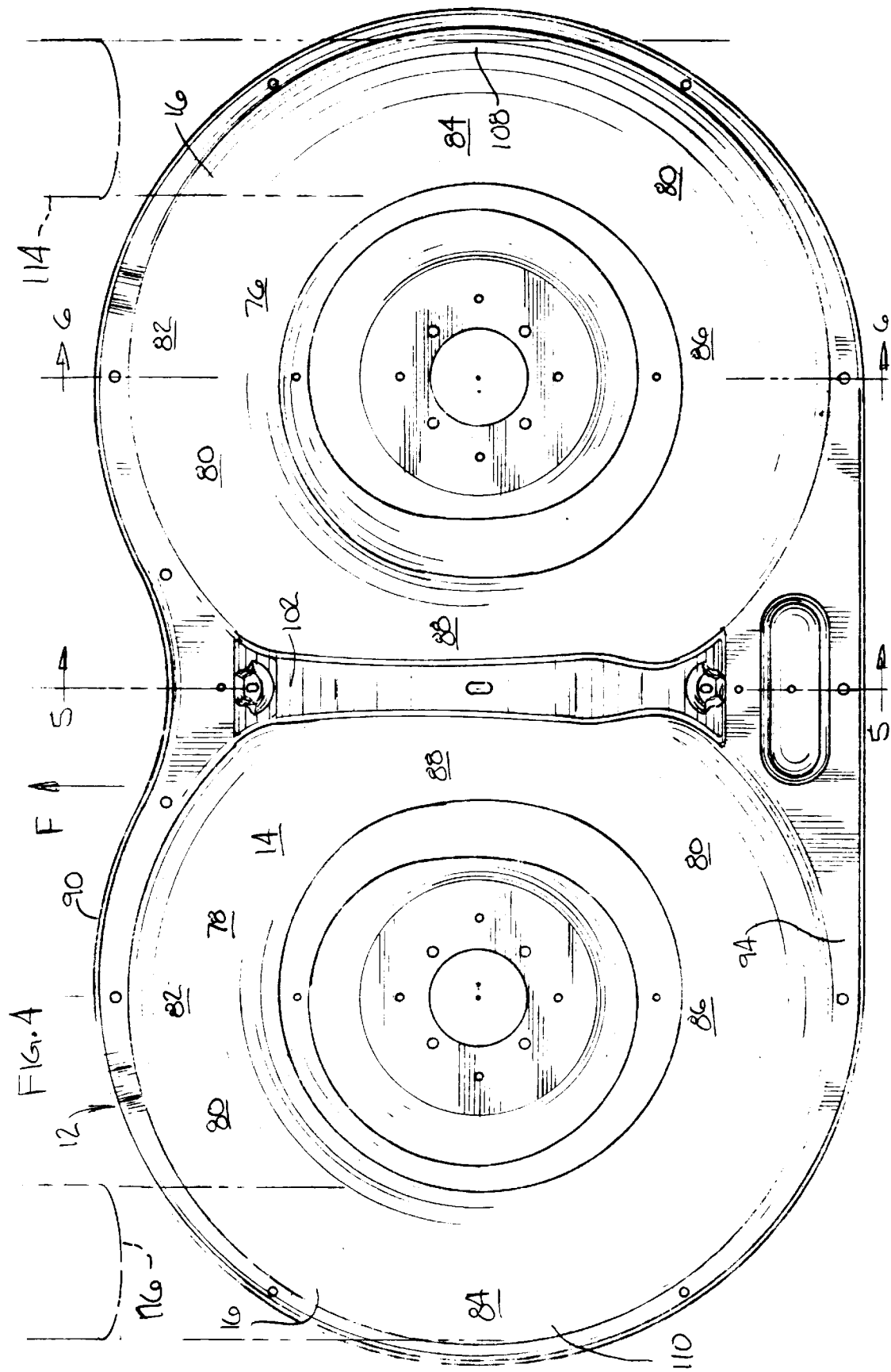

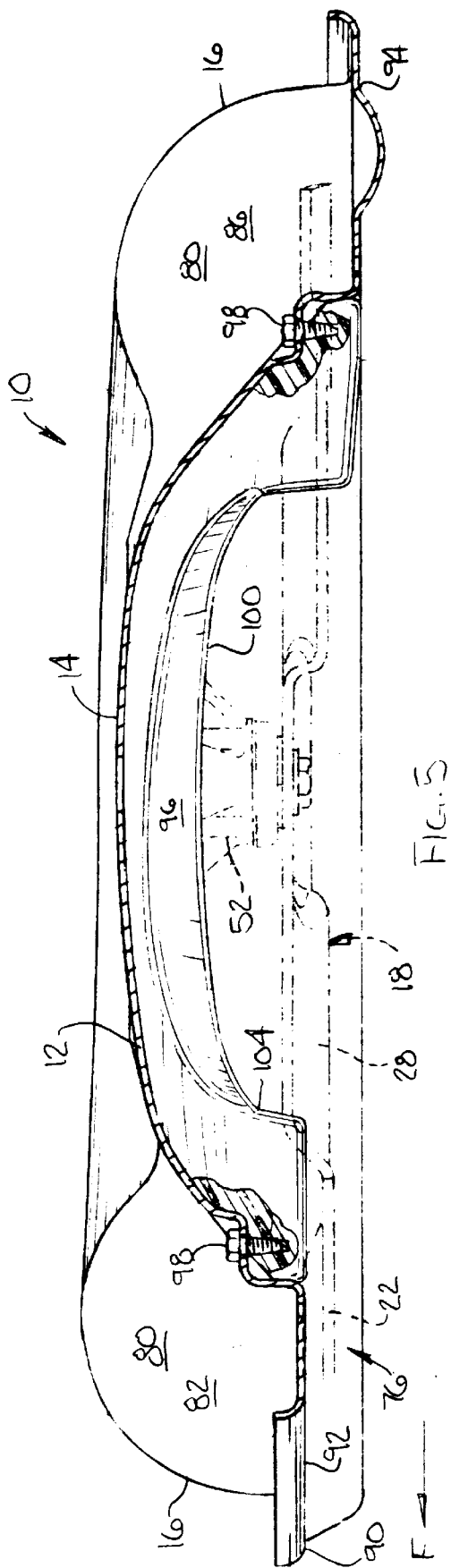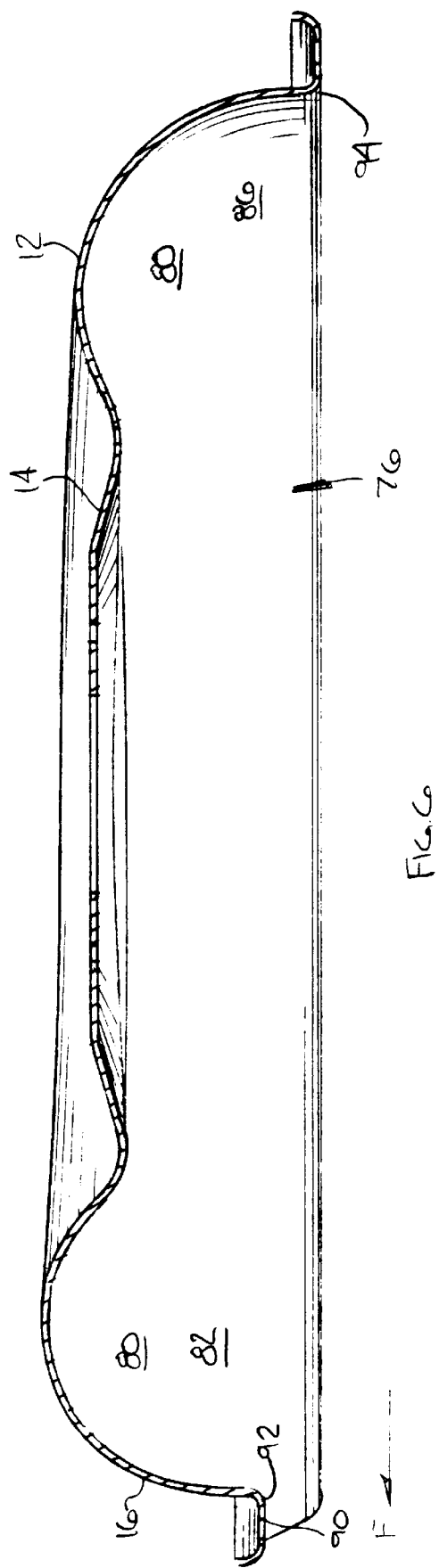

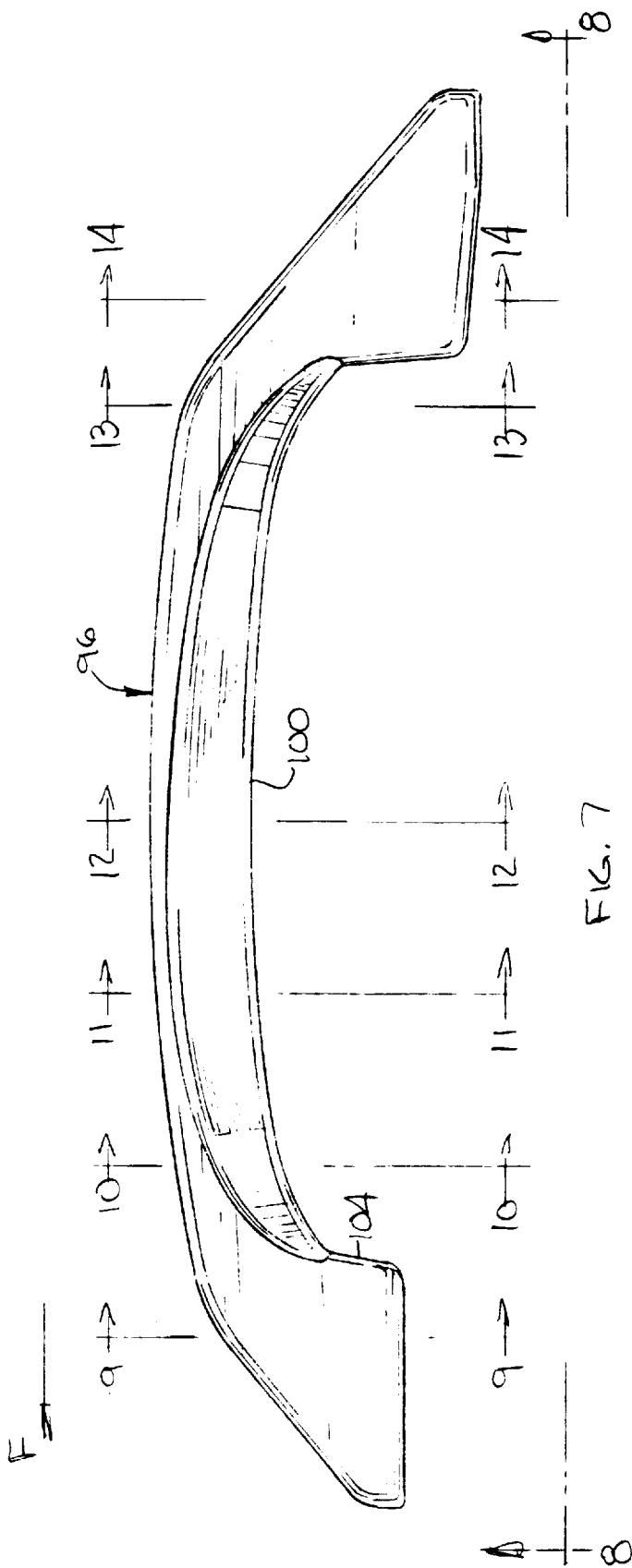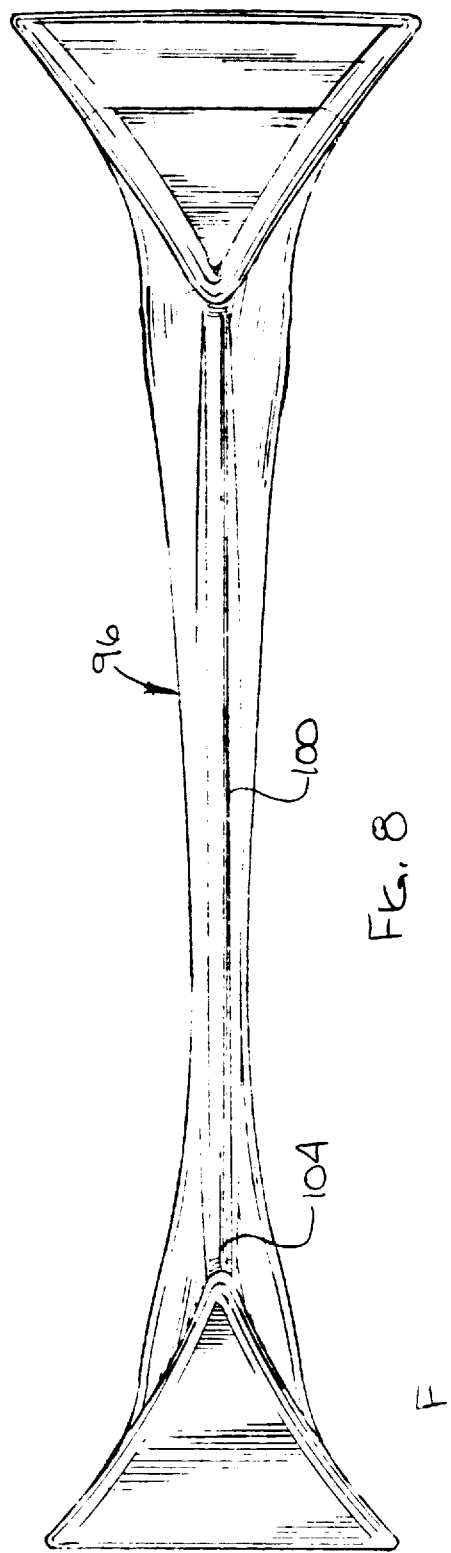

MOUNTING PLATE FOR MOWER DECK

This invention relates to multi-spindle mower decks used for mowing and mulching grass, and the belt drive systems which drive the mower blades, and mechanisms for mounting the drive systems to the mower deck.

BACKGROUND OF THE INVENTION

It is known to provide a mower deck within which several mower blades rotate to cut grass. Each blade is mounted to a respective spindle which is rotatively supported within a spindle housing. The spindle housings are typically fixed as by bolts to the mower deck. Pulleys are mounted to the tops of the spindles and are engaged by a belt. The belt is driven by the engine or other power source of the mower. The belt therefore drives the pulleys, spindles and blades. A series of idler pulleys are typically also provided which engage the belt for applying the proper amount of belt tension and pulley engagement during mowing operation. The idler pulleys are typically mounted to the mower deck by attachment hardware such as bolts. The attachment hardware typically extends through the material of the deck and extends at least a short distance into the interior of the deck's cutting chamber. The presence of the attaching hardware within the cutting chambers can act as an obstruction against which clippings can accumulate. The accumulation of clippings can eventually clog the cutting chamber and negatively impact the effectiveness of the mowing operations, which can reduce cut quality.

It would therefore be desireable to provide a multi-spindle mower which reduces the tendency of clippings to accumulate within the cutting chamber. The effectiveness and cut quality of the mower would thereby be enhanced by such a mower.

SUMMARY OF THE INVENTION

The present invention provides a mulching mower mechanism having a deck within which first and second mower blades rotate for cutting and mulching grass. First and second mulching mower blades include an outer cutting portion having a trailing upturned wing and an inner mulching portion having a trailing downturned wing. First and second blade chambers are positioned adjacent each other and house the respective first and second blades during operation.

A belt drive system drives the mower blades during mowing operations. A V-shaped belt is driven by the mower vehicle's engine or power source. The belt engages a drive pulley fixed to the first spindle. A first toothed pulley is fixed with the first spindle and engages a toothed belt. The toothed belt also engages a second toothed pulley which is fixed with the second spindle. The toothed belt thereby transmitts rotational motion between the first and second spindles by way of the first and second toothed pulleys. Idler pulleys engage the toothed belt for placing the appropriate amount of drive tension in the toothed belt during mowing operation.

A mounting plate is provided which supports a portion of the belt drive system according to the present invention. The mounting plate extends generally between the first and second spindles and is positioned above and abuts against the upper surface of the top wall of the mower deck. Bolts which hold the spindle housings in place therefore also help hold the mounting plate in place against the top wall of the deck. The idler pulleys are mounted to and supported by the mounting plate. A tensioning mechanism is also attached to and supported by the mounting plate. The tensioning mechanism applies a force to the second idler so that the proper amount of tension can be placed in the toothed belt. The idler pulleys and tensioner mechanism are attached to the mounting plate and therefore are not attached directly to the mower deck. The present invention therefore eliminates attachment hardware that extends into the interior of the cutting chambers where it might cause accumulations and clogging of clippings. The mounting plate also helps stiffen and rigidify the deck and holds the spindles as they encounter forces imparted by the toothed belt during operation. The mounting plate also helps rigidify the deck in response to impact loads encountered by the blades when the blades hit obstructions. The mounting plate is easily attached to the mower deck by way of the spindle housing attachment bolts. Therefore, no additional attaching hardware or structures are required to couple the mounting plate to the mower deck.

BRIEF DESCRIPTION OF THE DRAWINGS

FIG. 1 is a perspective view of the mower deck and drive mechanism according to the present invention shown detached from a lawn tractor vehicle.

FIG. 2 is a schematic explaining how FIGS. 3A and 3B should be viewed together in side by side relationship.

FIG. 3B is a partial sectional view of the left rear portion of the mower deck mechanism of FIG. 1.

FIG. 4 is a plan view of the mower deck of FIG. 1.

FIG. 5 is a partial sectional view along the center of the mower deck of FIG. 1, showing the entire flow divider in solid lines.

FIG. 6 is a sectional view of the mower deck of FIG. 4.

FIG. 7 is a side view of the flow divider.

FIG. 8 is a view from beneath the flow divider.

DETAILED DESCRIPTION OF THE PREFERRED EMBODIMENT

Figure 3A:
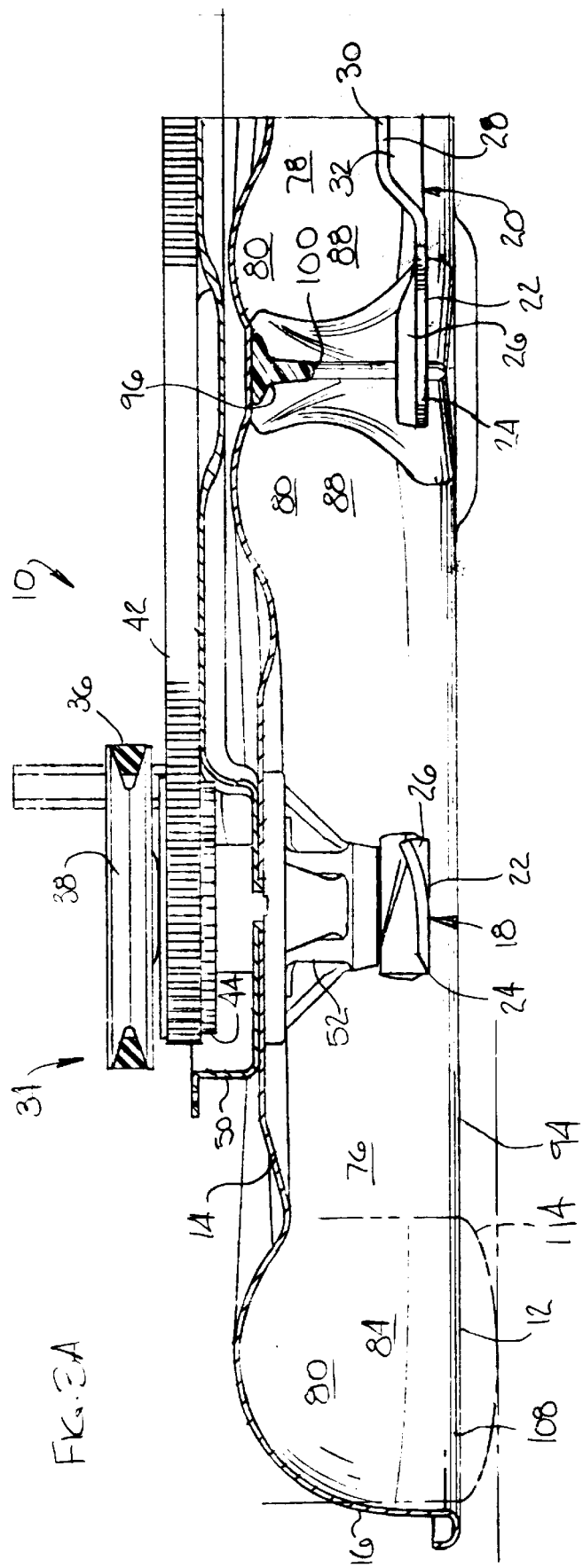
FIG. 3A is a partial sectional view of the right rear portion of the mower deck mechanism of FIG. 1.
Figure 9:
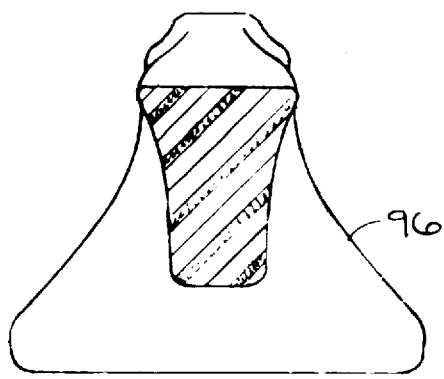
FIGS. 9–14 are sectional views of the flow divider shown in FIG. 7.
Figure 10:
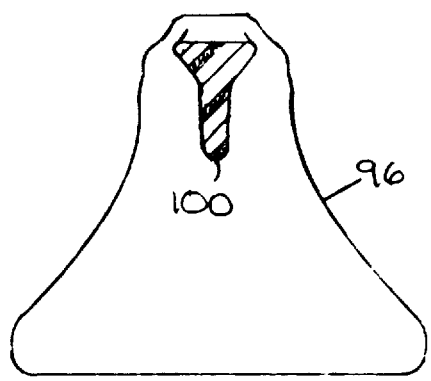
Figure 11:
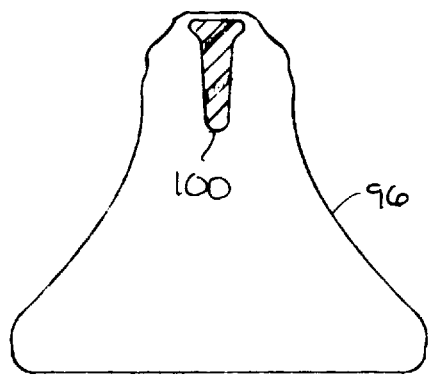
Figure 12:
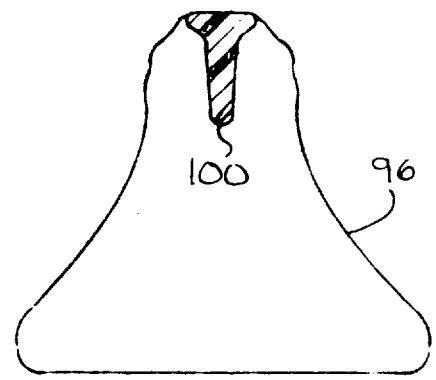
Figure 13:
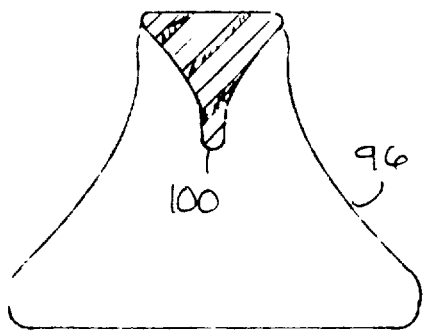
Figure 14:
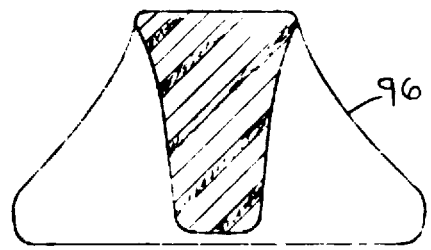

Referring now to FIGS. 1–15, there is shown the preferred embodiment of the present invention. A mulching mower mechanism 10 is provided which includes a mower deck 12 adapted for being suspended or otherwise attached beneath the frame of a lawn tractor (not shown) between the vehicle's front and rear pairs of wheels. The deck 12 includes a top wall 14 and side walls 16. The mower deck 12 is generally completely enclosed and does not provide a discharge outlet through which clippings are expelled. Therefore, clippings cut by the mower blades 18 and 20 recirculate within the deck 12 to be re-cut or mulched by the blades 18 and 20. The clippings are then deposited into the turf. Mulching blades 18 and 20 are utilized to maximize the re-cutting of clippings within the deck 12. The mulching blades 18 and 20 include an outer cutting portion 22 with a leading cutting edge 24 and a trailing upturned wing 26 which creates an updraft as the blade 18 and 20 rotates for suspending clippings within the deck 12. The blades 18 and 20 also include an inner mulching portion 28 with a leading cutting edge 30 and a trailing deflector portion 32 which is designed to deflect air and clippings downwardly for directing mulched clippings into the turf.

The mower mechanism 10 includes a drive system 34 which causes the first and second blades 18 and 20 to rotate within the mower deck 12. A conventional belt drive mechanism (not shown) which includes a conventional V-belt 36 is utilized for driving a drive pulley 38. The drive pulley 38 is mounted to a first spindle 40 to which the first or right blade 18 is also mounted. A flexible toothed timing belt 42 engages a first toothed sprocket 44 mounted with the first spindle 40. The toothed belt 42 also engages first and second toothed idlers 46 and 48 mounted to a mounting plate 50. The mounting plate 50 is operatively mounted to the deck 12 by way of bolts 106 that fix the spindle housing 52 and 54 to the deck 12. The second toothed idler 48 tensions the toothed belt 42. A second toothed sprocket 56 is drivingly engaged by the toothed belt 42. The second toothed sprocket 56 is fixed with a second spindle 58 to which the second or left blade 20 is mounted. During operation, the V-shaped belt 36 transmits rotational motion to the drive pulley 38. The first spindle 40, first toothed sprocket 44 and first blade 18 rotate with the drive pulley 38. The toothed belt 42 transmits rotational motion from the first toothed sprocket 44 to the second toothed sprocket 56. The second spindle 58 and second blade 20 then rotate with the second toothed sprocket 56. The drive system 34 is configured such that the right spindle 40 and right blade 18 will rotate in a clockwise direction and the left spindle 58 and left blade 20 will rotate in a counterclockwise direction. The right and left blades 18 and 20 are therefore counter-rotating.

A tensioning mechanism 60 is supported by the mounting plate 50. The tensioning mechanism 60 includes a bracket 62 to which the second toothed idler 48 is mounted. The second toothed idler 48 is held within a slot formed in the mounting plate 50. A rod 64 having a threaded end portion 66 is received by the bracket 62, and is pivotally mounted to the mounting plate 50. A compression spring 68 is positioned between a portion of the bracket 62 and a washer 70 held in place by a nut 72 threaded on the rod 64. The spring 68 presses against the washer 70 and bracket 62 to press the bracket 62 and second toothed idler 48 in a direction that will place tension in the toothed belt 42. The length of the spring 68 can be adjusted by manipulating the nut 72 on the threaded end portion 66 of the rod 64 to thereby place the proper tension in the toothed belt 42 and for insuring that the toothed belt wraps properly around the various sprockets and idlers. Once the appropriate amount of tension is placed in the toothed belt 42, the second toothed idler 48 can be fixed with respect to the mounting plate 50.

Figure 15:
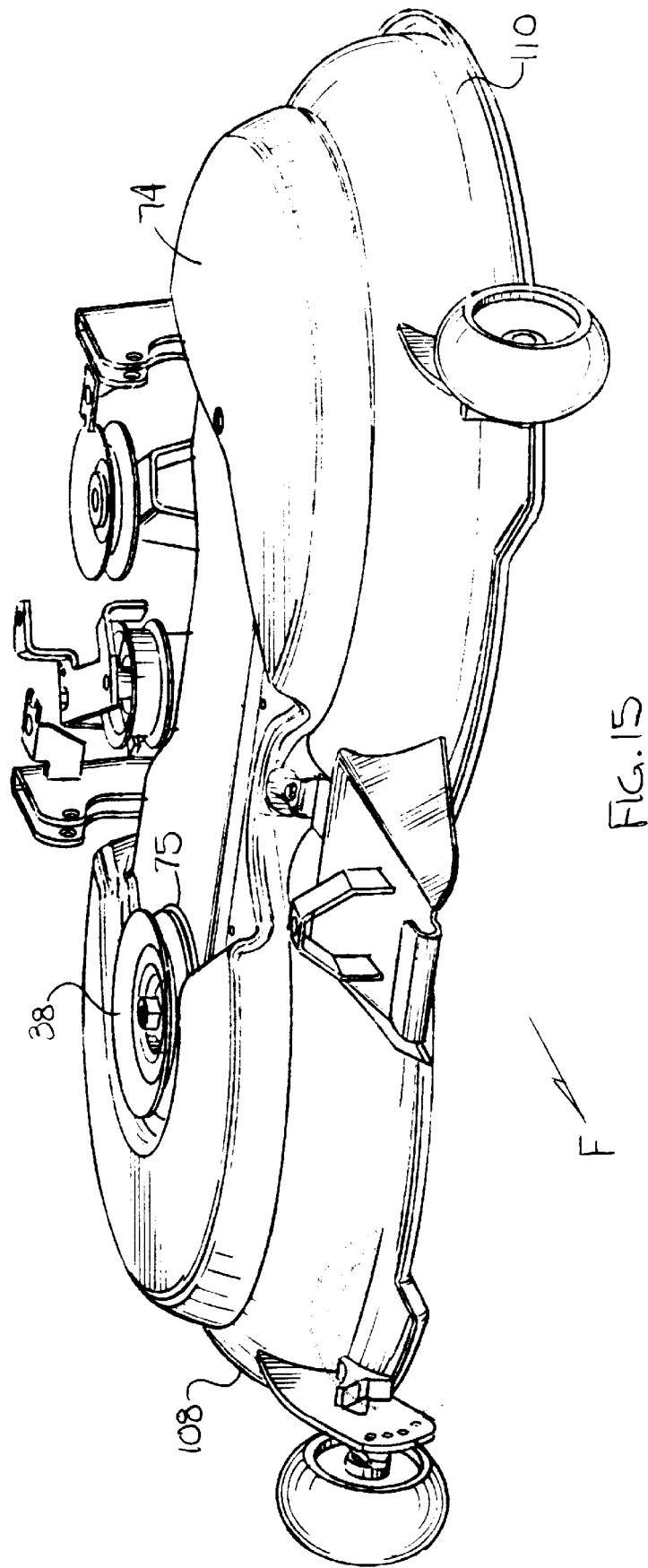
FIG. 15 is a perspective view of the mower deck and cover.

A cover 74, as best seen in FIG. 15, can be attached to the mounting plate 50 and will serve to generally enclose the drive mechanism 34 and generally confine and reduce noise created by the toothed belt drive system 34. The cover 74 also acts as a barrier that helps prevent debris from accumulating on and around the belt drive system 34 and therefore improves the drive system operation. The cover 74 includes an opening 75 through which the drive pulley 38 passes when the cover 74 is being installed on the deck 12. A plurality of attaching bolts 77 secure the cover 74 to the flange portion 79 of the mounting plate 50. By attaching the cover to the mounting plate 50 and not the deck 12, the present invention eliminates attaching hardware that might extend into the interior of the blade chambers 76 and 78.

The mounting plate 50 provides structure for supporting the toothed idlers 46 and 48 and tensioning mechanism 60. Therefore, the toothed idlers 46 and 48 and tensioning mechanism 60 are not coupled directly to the mower deck 12. The attaching hardware which mounts the toothed idlers 46 and 48 and tensioning mechanism 60 to the mounting plate 50 does not protrude through the mower deck 12 to the interior of the blade chambers 76 and 78. The interior of the blade chambers 76 and 78 therefore remains smooth and continuous and does not include any sharp of protruding structures against which clippings can accumulate and clog the deck 12. Effective mowing and mulching is thereby facilitated.

The mounting plate 50 also serves as a stiffener which rigidifies the spindles 40 and 58 as the toothed belt 42 applies forces to the spindles 40 and 58. The mounting plate 50 also helps resist forces encountered when the blades 18 and 20 hit obstructions. These forces are transmitted from the blades 18 and 20 to the spindles 40 and 58 to the spindle housings 52 and 54 and then to the mounting plate 50 and deck 12. The mounting plate 50 helps absorb these forces and generally rigidifies the deck 12 and helps prevent the deck 12 from deforming under these loads. Embossments 112 and a flange portion 79 formed integral with the mounting plate 50 help strengthen and rigidify the mounting plate 50. Such embossments 112 or other rigidifying shapes, if formed in the deck itself for rigidifying the deck against loads encountered during operation would establish shapes on the interior of the chambers which would act as structure to which wet and sticky grass clippings would adhere. The mounting plate 50 therefore provides structure in which stiffening shapes 79 and 112 can be formed without adversely affecting the flow of material within the blade chambers 76 and 78. The mounting plate 50 may also help isolate vibrations created by the toothed idlers 46 and 48 and drive system 34.

The attaching hardware that couples the first toothed idler 46 to the mounting plate 50 includes a washer, hex bolt, spacer and locknut washer. The attaching hardware that couples the second toothed idler 48 with the mounting plate 50 includes a spacer, carriage bolt and locknut washer.

Next, the shape of the mower deck 12 according to the present invention will be discussed. The mower deck 12 includes adjacent first and second blade chambers 76 and 78 within which the respective right and left blades 18 and 20 rotate during operation. Each blade chamber 76 and 78 includes a channel 80 which extends around the blade's axis of rotation and spindle 40 or 58. The front, side and rear portions 82, 84 and 86 of the channels 80 extend at a generally constant radius from the spindle 40, 58. The portions 88 of the channels 80 directly between the spindles 40 and 58 extend closer to the spindles 40 and 58 than do the other regions of the channels 80. The channels 80 of the blade chambers 76 and 78 can therefore be described as being D-shaped when viewed from above, with their flatted portions 88 being positioned directly adjacent one another. The flatted portions 88 of the channels 80 helps direct clippings and air inwardly so that they do not flow into or interact with the flow in the other blade chamber 76 or 78.

The rotating blades 18 and 20 operate to cut the growing grass plants near the front portion 82 of the mower deck 12 in the area where the outer cutting portions 22 of the blades 18 and 20 are traveling outwardly away from the centerline of the deck 12. The trailing upturned wing portion 26 generates an updraft within the blade chamber 76 and 78. After the grass has been cut at the front 82 of the chamber 80, the upturned wing 26 lifts the clippings and directs them in the direction of blade rotation. The clippings will thereby be transported through the channel 80 so they can be recut into finer particles by the blade 18, 20. The front portion 82 of the channels 80 are spaced a relatively large distance above the blades 18 and 20 and are relatively tall and narrow for allowing clippings and air to travel a significant distance above the blades 18 and 20. The channels 80 then slope down from the front portion 82 to the lower rear portion 86.

The rear portion 86 of each channel 80 is relatively shallow and wide. The low top wall 14 of the rear portion 86 of the channel 80 forces clippings downwardly where they are more likely to interact with the blade 18, 20 for being recut. The lower top wall 14 of the rear portion 86 of the channel 80 also helps allow finely mulched clippings to be directed or drop into the turf 86 of the channel 80 is relatively wide which allows the clippings to travel radially inwardly where they are more likely to interact with the inner mulching portion 28 of the blade 18, 20 for being recut into smaller particles and directed downwardly into the turf by the trailing downturned wing 32.

A front skirt portion 90 of the mower deck 12 includes a lowermost edge 92 that is somewhat higher than a rear skirt portion 94. The higher front skirt 90 allows clearance for the deck 12 to travel over the growing grass without trampling or bending the grass plants forwardly. The grass plants are therefore in a better position to be lifted by the updraft within the chambers 76 and 78 and are in better position to be cut by the blade 18, 20. Other portions of the sidewalls 16 of the chambers 76 and 78 are lower than the front skirt 90 to help confine clippings within the chambers for recutting.

The blades 18 and 20 of the present invention are counter-rotating, and travel in paths which overlap by approximately two inches. The blade chambers 76 and 78 are positioned directly adjacent one another for allowing the blade paths to overlap in an area between the chambers 76 and 78. A flow divider 96 is fixed as by screws 98 to the top wall 14 of the mower deck 12 in the area between the chambers 76 and 78. The flow divider 96 extends downwardly from the top wall 14 of the mower deck 12 and defines a lowermost edge 100 which is in relatively close proximity to the top of the rotating blades 18 and 20. The flow divider 96 helps establish a barrier between the two chambers 76 and 78 so that interaction between air and clippings between chambers is minimized. If the flow in the two chambers 76 and 78 were allowed to interact more between the chambers 76 and 78, large clumps of clippings might tend to accumulate in this area. This is because the blades 18 and 20 direct clippings forwardly in the area between the chambers 76 and 78, and may otherwise cause clumps of suspended clippings to accumulate in the front central portion 102 of the deck 12. However, the flow divider 96 tends to prevent the flow in one chamber 76 or 78 from interacting with the flow in the other chamber 76 or 78 and helps direct clippings in a circular motion within the respective chambers 76, 78 so that large clumps tend not to accumulate in the front central region 102 of the deck 12. Furthermore, the flow divider 96 helps break up any large accumulation of clippings in this area 102. Clumps that may accumulate in the region between the chambers tend to be split in half by a forward edge 104 of the flow divider 96 which extends in the vertical dimension. This forward edge 104 helps divide any mass of clippings so that the clippings will be recirculated within the two chambers 76 and 78 and be further dispersed.

The flow divider 96 shown in the drawings is a plastic part that is fixed as by screws 98 to the top wall 14 of the deck 12. The deck 12 is a stamped metal part. Due to the shape of the flow divider 96, it may be difficult and/or costly to form the flow divider 96 as an integral portion of the deck 12 when stamping a piece of sheet metal. Furthermore, forming the shape of the flow divider 96 integral with the deck 12 may make the deck 12 unacceptably weak and susceptible to flexing in the area of the flow divider 96. Therefore, the flow divider 96 is formed as a separate part and assembled to the deck 12. The flow divider 96 shown in the drawings adds rigidity to the deck 12. However, a deck with an integral flow divider could be formed by a stamping process without departing from the spirit of the present invention.

The mulcher mowing mechanism 10 according to the preferred embodiment is designed to eliminate any protrusions within the chambers 76 and 78 to which clippings might adhere. Clogging within the chambers 76 and 78 is thereby minimized even when mowing in wet conditions. The interior surface of the deck 12 is generally smooth and continuous without any sharp corners or structural protrusions against which clippings might stick and accumulate. Very little hardware such as bolts or other fixtures are attached directly to the walls of the deck 12. Idler pulleys of conventional mowers are often mounted directly to the deck. The toothed idlers 46 and 48 according to the present invention are mounted to a mounting plate 50 which extends between the first and second spindles 40 and 58. The mounting plate 50 is fixed with the deck 12 by being confined between the spindle housings 52 and 54 and the top wall 14 of the deck 12. Attaching hardware or bolts 106 secure the spindle housing 52 and 54 to the deck 12 and thereby secure the mounting plate 50 in place. The mounting hardware of the toothed idlers 46 and 48 therefore do not protrude through to the interior of the deck 12. Clogging of clippings inside the chambers 76, 78 is thereby reduced due to the smooth and continuous interior surface of the chambers 76, 78 and the lack of structure against which clippings may stick and clog.

The mulching mechanism 10 according to the preferred embodiment provides a right blade 18 which rotates clockwise and a left blade 20 which rotates counterclockwise. The deck 12 is positioned beneath the belly of a lawn tractor such that the right front wheel 114 of the tractor is generally aligned with the outer right portion 108 of the right blade chamber's channel 80, and the left front wheel 116 of the tractor is generally aligned with the outer left portion 110 of the left blade chamber's channel 80, as best seen in FIGS. 3A and 3B. During normal forward operation the front tires 114 and 116 will travel over a strip of turf and generally press or bend the blades of grass forwardly. The outer portions 108 and 110 of the channels 80 will then pass directly over this strip of flattened grass. The upturned wing portion 26 of the cutting blades 18, 20 are travelling rearwardly in this location, such that the draft created by the blade 18, 20 is directed rearwardly and upwardly. The rearwardly and upwardly directed draft is therefore directed in an ideal direction for maximum lifting of the forwardly bent grass plants that have been run over by the front tires 114 and 116.

The paths of the right and left blade 18 and 20 overlap in the area between the chambers 76 and 78, and therefore the grass between the blades 18 and 20 will be properly mowed without leaving an uncut strip of grass between the blades 18 and 20. Therefore, staggering or offsetting the chambers 76 and 78 in a diagonal configuration is not required. The chambers 76 and 78 are positioned directly laterally of one another and therefore are relatively compact for being positioned beneath a relatively small lawn tractor. Furthermore, this configuration of chambers 76 and 78 allows the operator to easily maneuver the lawn tractor to either the right or left, and allows an operator to mow or trim close to obstructions easily with either side of the deck 12.

I claim:

1. A mechanism having a multiple spindle mower deck within which a plurality of mower blades rotate for mowing grass, comprising:

spindle housings which rotatively support respective spindles to which the mower blades are fixed for rotation, said spindle housings being operatively rigidly fixed with the mower deck, a belt drive mechanism for driving the spindles, including pulleys mounted to respective spindles and a belt which operatively engages said pulleys, at least one idler pulley which engages the belt, a mounting plate to which said at least one idler pulley is mounted, said mounting plate being positioned above the mower deck and is operatively fixed with the deck and spindle housings by way of attaching hardware that fix the spindle housings with the deck.

2. The invention of claim 1, wherein said mounting plate is fixed in abutment with the top wall of the mower deck.

3. The invention of claim 1, wherein the attaching hardware further comprise bolts which operatively press the mounting plate downwardly against the deck, which in turn operately presses the deck against the spindle housing.

4. The invention of claim 3, wherein at least one of said idler pulleys is a tensioning idler which engages the belt for placing tension in said belt, and a tensioning mechanism operatively engages the tensioning pulley for applying a force to the idler pulley, said tensioning mechanism being mounted to said mounting plate by way of tensioning mechanism attaching hardware positioned entirely above the top wall of the deck.

5. The invention of claim 4, wherein said mounting plate is fixed in abutment with the top wall of the mower deck.

6. The invention of claim 3, wherein said bolts and spindle housing are the sole means of securing the mounting plate with the mower deck.

7. The invention of claim 6, wherein at least one of said idler pulleys is a tensioning idler which engages the belt for placing tension in said belt, and a tensioning mechanism operately engages the tensioning pulley for applying a force to the idler pulley, said tensioning mechanism being mounted to said mounting plate.

8. The invention of claim 7, wherein said mounting plate is fixed in abutment with the top wall of the mower deck.

9. A multiple spindle mower deck within which a plurality of mower blades rotate for mowing grass, comprising:

spindle housings which rotatively support respective spindles to which the mower blades are fixed for rotation, said spindle housings being operatively rigidly fixed with the mower deck, a belt drive mechanism for driving the spindles, including pulleys mounted to respective spindles and a belt which operatively engages said pulleys, at least one idler pulley which engages the belt, a mounting plate to which said at least one idler pulley is mounted, said mounting plate being positioned in close proximity to the mower deck and operatively fixed with the spindle housings, wherein the spindle housings are fixed to the mower deck by bolts which operatively press the mounting plate, deck and spindle housing together, and wherein said bolts and spindle housing are the sole means of securing the mounting plate with the mower deck.

10. The invention of claim 9, wherein at least one of said idler pulleys is a tensioning idler which engages the belt for placing tension in said belt, and a tensioning mechanism operatively engages the tensioning pulley for applying a force to the idler pulley, said tensioning mechanism being mounted to said mounting plate.

11. The invention of claim 10, wherein said mounting plate is fixed in abutment with the top wall of the mower deck.

* * * * *